Dec. 21, 1943.   H. B. GATES   2,337,323
REFRIGERATING DEVICE
Filed Jan. 9, 1942
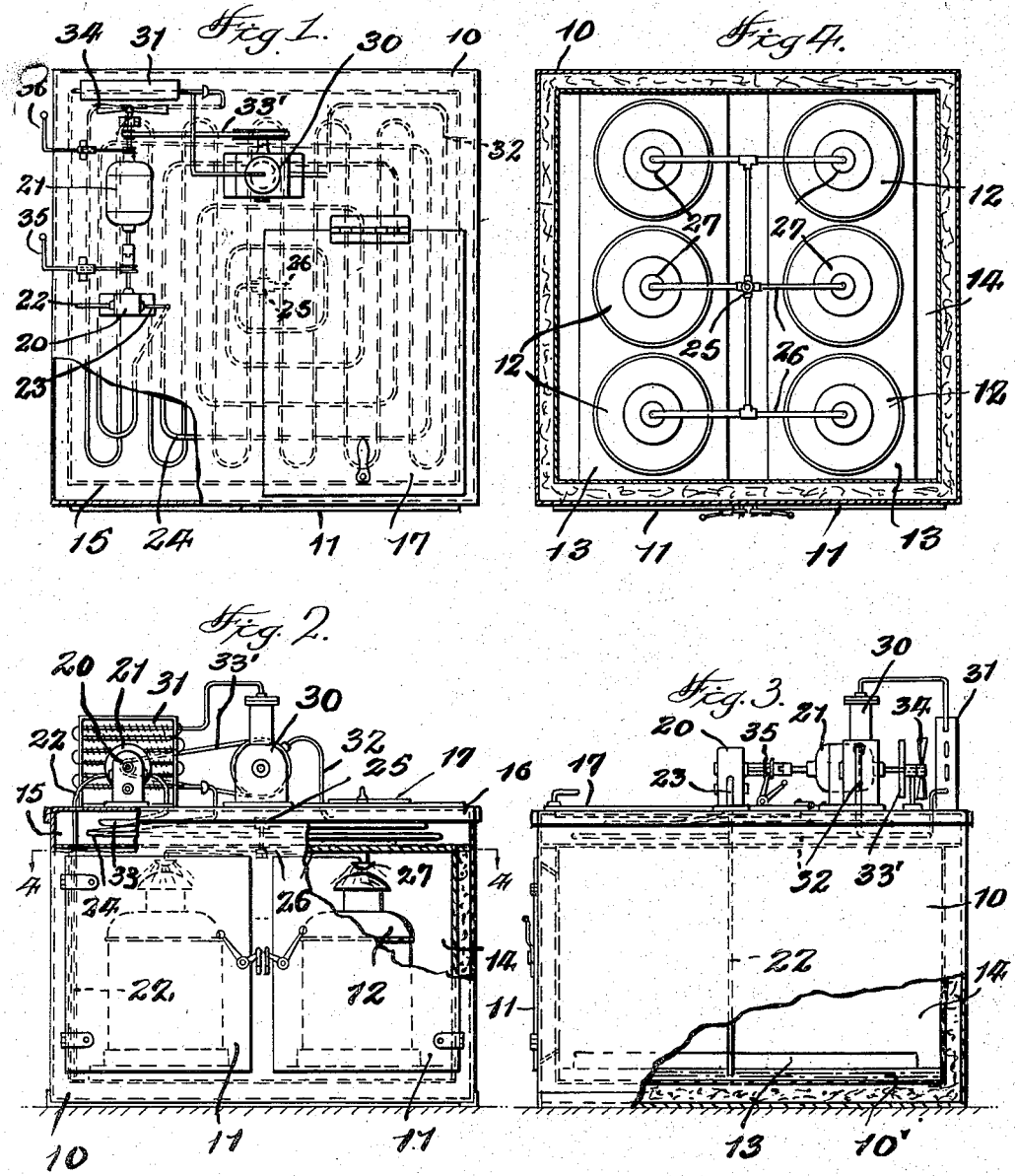
Inventor
Howard B. Gates
By Christian R. Nielsen
Attorney Patented Dec. 21, 1943

2,337,323

UNITED STATES PATENT OFFICE 2,337,323

REFRIGERATING DEVICE

Howard B. Gates, Columbia Cross Roads, Pa.

Application January 9, 1942, Serial No. 426,217

1 Claim. (Cl. 62—104)

The invention has for an object to effect improvements in refrigerating devices adapted to use with ice or other refrigerant, including electrically operated refrigerant compressors and expanders, as well as refrigerating elements of the absorption type. In its present embodiment the invention is especially advantageous and adapted for use in milk coolers for use on farms and elsewhere, to cool the cans of milk prior to shipment.

It is an important object of the invention to enable the use of the principle now employed in milk cooling devices of transferring heat from the milk by means of water brought into contact with the cans, but eliminating much of the complexity of prior apparatus and adding greatly to the convenience of handling of the milk cans. Thus, my invention avoids the need for lifting cans over the edge of a deep vat, and permits the introduction and removal of the cans of milk by simple movement in a horizontal direction.

Another important aim is to reduce the amount of water which must be chilled in order to effect the transfer of heat thereto from the cans. A still further object is to enable the construction of the device in an extremely small size for the accommodation of a number of cans, as compared with prior practice.

It is an important aim of the invention to effect a novel function in the cooling of the milk, by setting up a thermo-circulation of the milk within the can in a more effective manner than has heretofore been possible, to the end that a body of chilled milk does not tend to collect in the bottom of the can while warm milk may accumulate at the top.

A further important aim is to so construct the apparatus that it may be used without change, for refrigeration with ice, or by mechanical refrigerating devices. A still further important aim is to present a construction wherein liquid in contact with ice does not come in contact with the milk cans, and in which water chilled by refrigerating coils of a mechanical system does not come in contact with the cans, thus, in either case, avoiding liability of communication of bacterial cultures, or peculiar flavors or odors which sometimes are communicated or favored where the ice water or the water from the cooling coils is brought in direct contact with milk cans.

A further aim is to enable the frequent replenishment of the heat transfer water without involving special expense due to work expended in cooling such water. Another aim is to obviate the need for a water agitating device. A further important aim is to arrange the parts so that chilled water is brought immediately into contact with the milk cans after chilling.

A still further important aim is to enable the construction of the device so that a quick change-over from operation by means of ice to operation of the same device by means of a compressor and expander mechanism may be effected without modification of the invention itself, as constructed and supplied from the factories.

Additional objects, advantages and features of invention reside in the construction, arrangement and combination of parts involved in the embodiment of the invention, as will be more readily understood from the following description and accompanying drawing, wherein Figure 1 is a top view of a complete system using mechanical refrigeration of the compressor-condenser-expander type, operated by an electric motor.

Figure 2 is a front elevation thereof.

Figure 3 is a side elevation thereof.

Figure 4 is a horizontal section of the apparatus.

Referring more particularly to the drawing, there is illustrated a cabinet 10, which may be generally rectangular in form, equipped at its access side with doors 11, with conventional hinge mountings and fastenings, closing suitable openings in the front wall of the cabinet, these openings being of a suitable height to permit the introduction of erect milk cans 12 of standard size therethrough with facility.

The bottom of the cabinet is set below the door opening, so as to form a shallow reservoir 10', or such reservoir may be formed at a more limited area if desired, with the bottom sloping thereto. Racks or slides 13 are provided over the reservoir, upon which the milk cans may be supported out of contact with any water which may be standing in the lower part of the cabinet, as shown in the drawing, these racks being adapted to accommodate sliding movement of the cans thereon, and if desired, may be of any conventional form adapted to be extended outwardly from the cabinet, when required or desired.

The cabinet thus affords a chamber 14, in which a number of milk cans of standard size may be accommodated. Ordinarily, the cabinet will be made so as to accommodate two cans on each side, or behind each door 11, one behind the other, but if desired the cabinet may be made deeper, as indicated in Figure 4. However, it is considered preferable to widen the cabinet for enlargement of its capacity, ordinarily. The top of the cabinet comprises a shallow reservoir 15, the bottom of which forms the top of the chamber 14, the sides of the reservoir 15 being coextensive with the sides of the cabinet, and the top of the reservoir comprising a removable lid 16, set over the reservoir and retained in place by gravity, this lid having an opening therein with hinge cover 17 for access to the interior of the reservoir 15 when desired, this opening being located at one side only of the device, leaving a substantial area of lid 16 available for the mounting of circulating pump and other equipment which may be desired.

Upon the lid there is mounted a water circulating pump 20, which may be operated in any manner, either by hand or by an electric motor 21, as shown, this pump having an intake pipe 22, which is extended downwardly to the lowest part of the reservoir space 10', and an outlet pipe 23 which is extended downwardly into the reservoir 16, and continued as a coil 24, located close to the bottom of the reservoir 15 in the present instance, for a reason which will be subsequently explained. The coil 24 has a terminal end extended downwardly into the chamber 14, as at 25, this pipe being branched horizontally close to the top of the chamber 14, as at 26, the extremities of these branches being equipped with spray nozzles 27 located over arbitrary positions in which the cans 12 will be disposed when introduced into the cabinet. The spray heads 27 will thus be located centrally over respective cans when introduced into the cabinet, as illustrated in Figures 2 and 4, and operated for a purpose which will be subsequently explained.

A small quantity of water, slightly more than sufficient to fill the coil 24 is introduced into the lower part of the cabinet, ordinarily approximately four or five gallons being sufficient for a machine adapted to cool four to six standard milk cans. Upon operation of the machine, most of this water will be taken into the coil 24, and only a very small quantity will be in the bottom of the cabinet at any time, except when changing the supply. Any usual means for removing or draining the water from the cabinet may be provided, these not being shown.

In the use of the apparatus, a quantity of crushed ice is introduced into the reservoir 15, and spread about over the coil 24, and the pump 20 operated to draw water from the lower part of the cabinet and circulate the same through the coils 24 to the nozzles 27, where it will be discharged over the cans which may be set under the nozzles. Owing to the small quantity of water which is thus circulated, it will be quickly cooled, and the coldest water will be discharged directly upon the cans, so that these are cooled at the upper parts, and along the sides, inducing a chilling of the milk immediately adjacent the sides and at the upper parts of the cans, so that the chilled milk at the sides will fall, drawing behind it milk chilled at the upper part of the cans, and the latter being replaced by warmer milk which will be displaced from the lower part of the cans upwardly by the more dense and heavier chilled milk. Owing to the fact that the milk cans are supported out of the body of water which may run to the bottom of the chamber 14 or accumulates to some extent therein, the milk in the bottom portion of the can is not further chilled beyond the temperature to which it has been reduced by the water falling along the sides of the can. In consequence, there is not established in the bottom of the cans a stratum of the coldest milk, but the milk at the bottom of the can will always be slightly warmer than that which falls along the sides of the can. Therefore there will always be a circulation of the milk in which the cooler portion will be falling at the sides of the cans and the warmer portion rising in the middle, even at the lowest temperatures to which the milk is reduced in the chilling operation. This will serve to prevent cream from accumulating at the top of the can, as well as preventing accumulation of very warm milk in the uppermost part of the can, as will occur with the prior common cooling tank in which the milk is set in a deep body of chilled water. In such prior apparatus, the accumulation of cream at the top of the can, together with the delay in reduction of the temperature thereof, if not complete failure to reduce such temperature, will result in development of a very high bacterial count in this upper portion of milk and cream, such development being further facilitated by the fact that the cream is the more favorable medium for the bacterial development than the separated milk, and tends to become sour sooner. The cream being the most valuable content of the milk body, this function of my invention is extremely important.

Milk cans may be removed and introduced into the cabinet at any time, either with or without stopping the discharge of the cooling water.

In the present instance, no valves are shown for cutting off the cooling water from any of the nozzle heads 27, the use thereof being discretionary.

In case it is desired to use the cabinet described with a mechanical compressor-condenser-expander system, it is possible to remove the cover 16 as a unit, after disconnection of the coil 24 and intake pipe 22, which may pass through suitable openings in the lid 16 and then permit lifting of the latter with the pump as a unit. The lid with the simple pump, or even the pump and motor 21, may thus be removed and replaced by another lid having a similar pump and motor, but in addition, having a compressor 30, condenser 31, and an expander coil 32, suitably connected to the compressor and condenser, the compressor being belted to the motor 21, as at 33', the usual fan 34 being incorporated on the motor shaft adjacent the condenser. Clutches 35 and 36 are preferably incorporated between the motor and pump, and between the motor and the belt 33', so that the compressor may be operated without operating the pump when desired, and also so that the pump may be operated without functioning of the compressor, in order to attain the greatest benefit from the power expended, and also to enable change of the water in the coil 24 when refrigeration is not required.

The coil 24 being located in the bottom of the reservoir 15, the alternate lid device 16 with the compressor unit and expansion coil mounted thereon may be set into place without disturbing the coil 24, the coil 33 being located under the lid so as to lie immediately over the coils 24. In case an absorption system is employed, the condensed refrigerant may be led therefrom to the reservoir 15 in a suitable coil corresponding to that 33, and returned therefrom to the absorber element, in accordance with usual practices in such systems, these being well understood and therefore are not illustrated in detail herein, and comprising no part of my invention.

While I have disclosed with great particularity a specific embodiment of my invention in the best form which I have thus far devised, it will, nevertheless, be understood that this is purely exemplary, and that various changes in construction, arrangement and combination of parts, substitution of materials and substitution of mechanical equivalents may be made without departing from the spirit of the invention, except as limited by the appended claim, wherein I claim:

A system of the character described, comprising a receiving chamber for receptacles to be cooled, a reservoir separate from said chamber, a water circulating coil in the lower part of said reservoir, a pump having a discharge connection with the influent end of said coil and having an intake connection opening in the lower part of said chamber, the effluent end of said coil having branched duct portions and respective terminal nozzles thereon, positioned in the upper part of said chamber in arbitrary spaced relation, means to support receptacles to be cooled in the chamber above normal liquid level in the chamber, said reservoir being constructed with its bottom constituting the top of said chamber, said water circulating coil being located close to the bottom of the reservoir, and a removable lid constituting the top of said reservoir, having a motor compressor-condenser unit mounted thereon and an evaporator coil mounted thereunder, positioned to lie closely over the water circulating coil, whereby said lid and devices thereon and evaporator coil thereunder may be lifted as a unit from said reservoir.

HOWARD B. GATES.